United States Patent
Arieli et al.

(10) Patent No.: US 10,415,954 B2
(45) Date of Patent: *Sep. 17, 2019

(54) METHOD FOR ANALYZING AN OBJECT

(71) Applicant: Adom, Advanced Optical Technologies Ltd., Lod (IL)

(72) Inventors: Yoel Arieli, Jerusalem (IL); Yoel Cohen, Nes Ziona (IL)

(73) Assignee: ADOM, ADVANCED OPTICAL TECHNOLOGIES LTD., Lod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,680

(22) Filed: Jul. 17, 2018

(65) Prior Publication Data

US 2019/0017804 A1    Jan. 17, 2019

Related U.S. Application Data

(63) Continuation of application No. 15/304,816, filed as application No. PCT/IL2015/050445 on Apr. 29, 2015, now Pat. No. 10,054,419.

(60) Provisional application No. 61/986,896, filed on May 1, 2014.

(51) Int. Cl.
*G01B 9/02*    (2006.01)

(52) U.S. Cl.
CPC ....... *G01B 9/02047* (2013.01); *G01B 9/0209* (2013.01); *G01B 9/02091* (2013.01)

(58) Field of Classification Search
CPC ............ G01B 9/02027; G01B 9/02029; G01B 9/0203; G01B 9/02047; G01B 9/02079; G01B 9/02081; G01B 9/0209; G01B 9/02091
See application file for complete search history.

(56) References Cited

U.S. PATENT DOCUMENTS

| | | | |
|---|---|---|---|
| 5,471,303 A | 11/1995 | Ai | |
| 5,953,124 A | 9/1999 | Deck | |
| 6,552,806 B1 | 4/2003 | Swinford et al. | |
| 8,269,980 B1 | 9/2012 | Szwaykowski | |
| 10,054,419 B2 * | 8/2018 | Arieli | G01B 9/0209 |

(Continued)

OTHER PUBLICATIONS

International Search Report and Written Opinion for application No. PCT/IL2015/050445 dated Jan. 2015.

(Continued)

*Primary Examiner* — Michael A Lyons
(74) *Attorney, Agent, or Firm* — Workman Nydegger (57) ABSTRACT

Apparatus and methods are described for determining tomographic and/or topographic data relating to an object. The object is illuminated with at least one wave packet from light generated by a multi-spectral light source. The wave packet is split into two split wave packets, and an optical path difference (OPD) is introduced between the two split wave packets, that is smaller than the coherence length of the wave packet. The two split wave packets are combined to generate a 2D image of the illuminated object, and the data relating to the object is determined by processing the 2D image using long coherence phase shift interferometry algorithms, by analyzing the 2D image as if the 2D image was generated using monochromatic light having a wavelength that is equal to a mean wavelength of the wave packet. Other applications are also described.

20 Claims, 3 Drawing Sheets

(56) References Cited

U.S. PATENT DOCUMENTS

2012/0327423 A1  12/2012  Hanebuchi
2014/0293286 A1  10/2014  Kapit
2017/0038191 A1   2/2017  Arieli et al.

OTHER PUBLICATIONS

Singh Mehta Dalip et al: "Quantitative phase imaging of human red blood cells using phase-shifting white light interference microscopy with colour fringe analysis", Applied Physics Letters, vol. 101, No. 20, Nov. 12, 2012 (Nov. 12, 2012), pp. 203701-203701.
Daesuk Kim et al: "White light on-axis digital holographic microscopy based on spectral phase shifting", Optics Express, vol. 14, No. 1, Jan. 9, 2006 (Jan. 9, 2006), pp. 229-234.
Non-Final Office Action for U.S. Appl. No. 15/304,816 dated Dec. 21, 2017.

* cited by examiner

METHOD FOR ANALYZING AN OBJECT

CROSS-REFERENCE TO RELATED APPLICATIONS

This application is a continuation of U.S. Ser. No. 15/304,816 to Arieli (issued as U.S. Pat. No. 10,054,419), which is the US national phase of International Application PCT/IL2015/050445 to Arieli (published as WO 15/166495), filed Apr. 29, 2015, which claims priority from U.S. Provisional Application 61/986,896, filed May 1, 2014.

FIELD OF THE INVENTION

This invention relates to high dynamic range with high accuracy interferometry measurements.

BACKGROUND OF THE INVENTION

In many technical fields there is a need for measuring the topography and tomography of objects. There are many optical methods for accomplishing the task such as the structured-light scanning method, confocal microscopy, phase shifting interferometry (PSI), optical coherence tomography (OCT) or holography.

In PSI, light is split by an interferometer to two beams, the object beam and the reference beam, and interference is generated between the object beam that is reflected from an inspected object, and the reference beam that is reflected from a reference mirror. A movement of the reference mirror induces a phase shift between the two beams and the resulting changing interference patterns are acquired by a 2D camera. From at least three different interference patterns, taken at different positions of the reference mirror, the object's surface is obtained with high accuracy. However, this method requires a temporal coherent light source and suffers from the $2\pi$ ambiguity problem. Hence, the accuracy is very high, in the order of sub wavelengths, but the dynamic-range is small.

In low coherence interferometry such as in OCT or While Light Interferometry (WLI), the light is split by a beam splitter in an interferometer to two beams, the object beam that is reflected from an inspected object and the reference beam that is reflected from a reference mirror. The returning beams are relayed by the beam splitter to a 2D imager, and form an interference pattern of the object's surface topography that is spatially sampled by the 2D imager pixels. However, the interference patterns are obtained only if the two beams have traveled optical paths with an Optical Path Difference (OPD) that is less than the coherence length of the light source.

The coherence length of a broadband light source is the width of the envelope of the coherence function of the light source which is the autocorrelation function of the light field. According to the Wiener-Khintchine theorem, the autocorrelation function of the light field is given by the Fourier transformation of the spectral density of the light source.

Figure 1A:
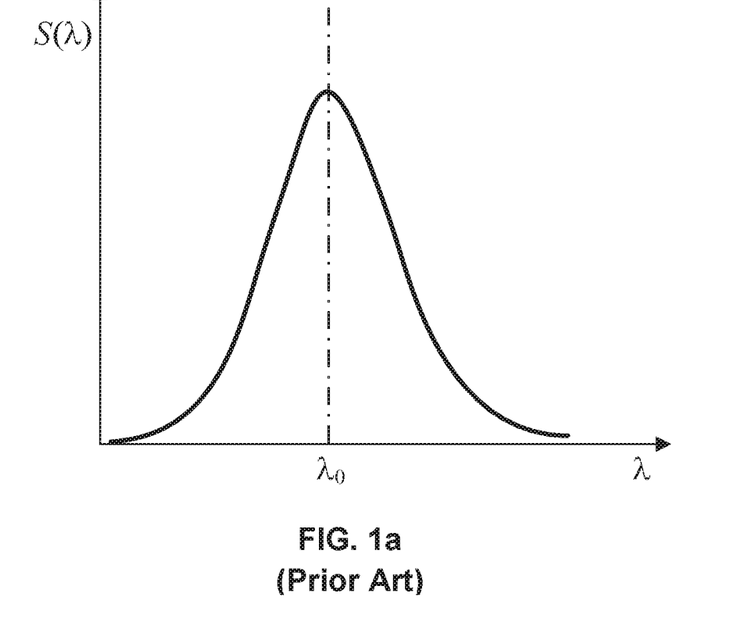
FIG. 1a shows schematically the spectral density function of a Gaussian spectrum light source.

As an example, FIG. 1a shows the spectral density function of a Gaussian spectrum light source where the normalized spectral density function of the light source is:

$$S(v) = \frac{1}{\sqrt{\pi}\,\Delta v}\exp\left[-\left(\frac{(v-v_0)}{\Delta v}\right)^2\right]$$

$2\Delta v$ is the effective $1/e$-bandwidth and $v_0$ is the mean frequency.

Figure 1B:
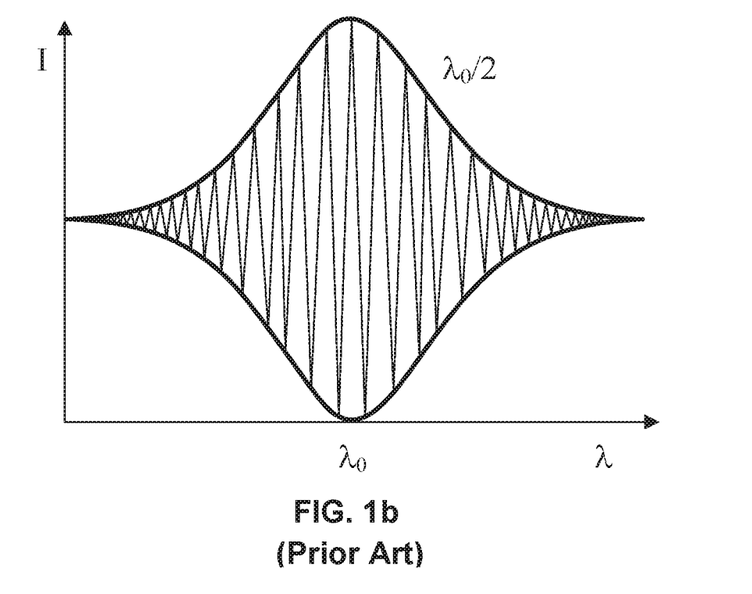

According to the Wiener-Khintchine theorem, the autocorrelation function of the light field is given by:

$$k(\tau)=\int_{-\infty}^{\infty}S(v)\exp(-i2\pi v\tau)dv=\exp(-\pi^2\tau^2\Delta v^2)\exp(-i2\pi v_0\tau)$$

The autocorrelation function is shown in FIG. 1b. This function represents the intensity of the interference patterns of two beams reflected from both Michelson interferometer's arms as a function of $\tau$—the time delay between the two beams which depends on the OPD between them by:

$$\tau = \frac{OPD}{c}$$

where c is the speed of light.

Fringes with visible contrast are obtained only when the OPD lies within the coherence length of the light source. When the OPD is larger than the coherence length, the fringes are invisible and the illumination is the average illumination. The contrast of the fringes is determined by the envelope of the coherent function and the period of the fringes (or modulations) inside the envelope is $\lambda_0/2$, where $\lambda_0$ is the mean wavelength of the light source. Accordingly, a broadband light source may be considered as a monochromatic light with the wavelength $\lambda_0$ and may be used for any kind of long coherence interferometry process as long as the OPD between the two interfering beams is shorter than the coherence length of the light source.

In short coherence interferometry, measurement of an object surface is done by changing the OPD between the measurement beam and the reference beam using a positioning stage when the measurement beam is reflected from the object and the reference beam is reflected from a reference surface. In this case as the OPD is changed constantly as a function of time and an interferogram is generated at each pixel. As mentioned above, the range of OPDs where the fringes of the interference are visible is the coherence length of the light source which depends on its spectral width. The maximum modulation of the interference signal of a pixel occurs when the OPD between the measurement beam and the reference beam is zero. Therefore, the optical distance of a point on the surface of the measured object imaged at this pixel relative to the reference surface corresponds to the OPD between this point and the reference surface, and it can be determined by noting when the modulation of the interference fringes is greatest. A matrix with the height values of the object surface can be derived by determining the z-values of the positioning stage where the modulation is greatest for every pixel. The lateral positions of the height values depend on the corresponding object point that is imaged by the pixel matrix. These lateral coordinates, together with the corresponding vertical coordinates, describe the surface topography of the object.

Although the dynamic-range of the WLI measurements is large (hundreds of microns), the accuracy is limited to the accuracy of defining the position where the modulation of the interference fringes is greatest, and is in the order of microns.

U.S. Pat. No. 5,953,124 discloses methods where both a phase shifting interferometry (PSI) analysis and a scanning white light interferometry (SWLI) analysis are applied to a single 3D interferogram. This allows the precision of PSI to be achieved without being limited by the $2\pi$ phase ambiguity constraint. The envelopes of the coherent functions of two reflected beams from two pixels of the object should overlap in order to compare the two calculated phases of the reflected light from these two pixels. In tomography there are several wave packets or envelopes that are reflected from different layers at each pixel, each from each object's layer. The accuracy of the tomography measurements can be increased by comparing between the calculated phases of all envelopes of each same pixel. Comparison between the respective phases of all envelopes of different pixels also increases the accuracy not only of the tomography measurement but also the topography measurement of the measured object.

SUMMARY OF THE INVENTION

It is an object of the present invention to provide a method and system that can perform full field tomography of an object by illuminating the object with a broadband light source, and that has both large dynamic-range combined with high accuracy.

As stated above, when an object is measured, the interference between the measurement beam reflected from the object and the reference beam reflected from the reference mirror while changing constantly the OPD, generates an interferogram at each pixel. The range where the fringes of the interference are visible is the coherence length of the light source, the period of the fringes is $\lambda_0/2$, and the position of maximum modulation is where the OPD between the measurement beam and the reference beam is zero. This can be interpreted as a wave packet with a width of the coherence function and wavelength $\lambda_0$ that is split by the beam splitter, one wave packet propagates at the reference arm and the other wave packet propagates at the measurement arm. Moving the mirror in the interferometer introduces an OPD between the two wave packets. Whenever the two wave packets overlap, the fringes are visible, and when the two wave packets don't overlap, the fringes are invisible. Thus, when using a broadband light for interference, it is similar to using a monochromatic light with the wavelength $\lambda_0$. The difference is that when using a broadband light there is a limitation that the maximum OPD between the two interfering beams will be no longer than the coherence length of the light source. Thus, all applications of long coherent light can also be realized by broadband light as long as the maximum OPD between the two interfering beams is kept below the coherence length of the light source or the excess OPD over the coherence length is compensated.

According to one embodiment, there is provided a tomographic and/or topographic measuring system of an object consists of a broadband light source, a splitting device to split the incoming light to two beams, a compensation device to compensate for an excess OPD, retarders for creating at least 3 phase retardations between said two beams and an imaging optical system that includes a monochrome camera or a detectors array for collecting and measuring the reflected light from the object. The detected light is processed and analyzed to obtain the tomography and topography of the object.

According to another embodiment, there is provided a tomographic and/or topographic measuring system of an object consists of a broadband light source, a splitting device to split the incoming light to two beams, a compensation device to compensate for an excess OPD, retarders for creating at least 3 phase retardations between said two beams, a color imaging optical system such as an RGB camera for collecting and measuring the reflected light from the object for different color bands. The detected light is processed and analyzed to obtain the tomography of the object. Each color band's measurement is interpreted as measuring the object by a different monochromatic light with a different mean.

According to another embodiment, there is provided a tomographic and/or topographic measuring system of an object consists of a spectral modulated broadband light source, retarders for creating at least 3 phase retardations between said two beams, a color imaging optical system such as an RGB camera for collecting and measuring the reflected light from the object. The detected light is processed and analyzed to obtain the tomography of the object. Each color band's measurement is interpreted as measuring the object by a different monochromatic light with a different mean wavelength and with an additional DC illumination.

BRIEF DESCRIPTION OF THE DRAWINGS

In order to understand the invention and to see how it may be carried out in practice, embodiments will now be described, by way of non-limiting example only, with reference to the accompanying drawing, in which:

FIG. 1b shows schematically the autocorrelation function of the spectrum depicted in FIG. 1a;

DETAILED DESCRIPTION

In the following description of some embodiments, identical components that appear in more than one figure or that share similar functionality will be referenced by identical reference symbols.

Figure 2:
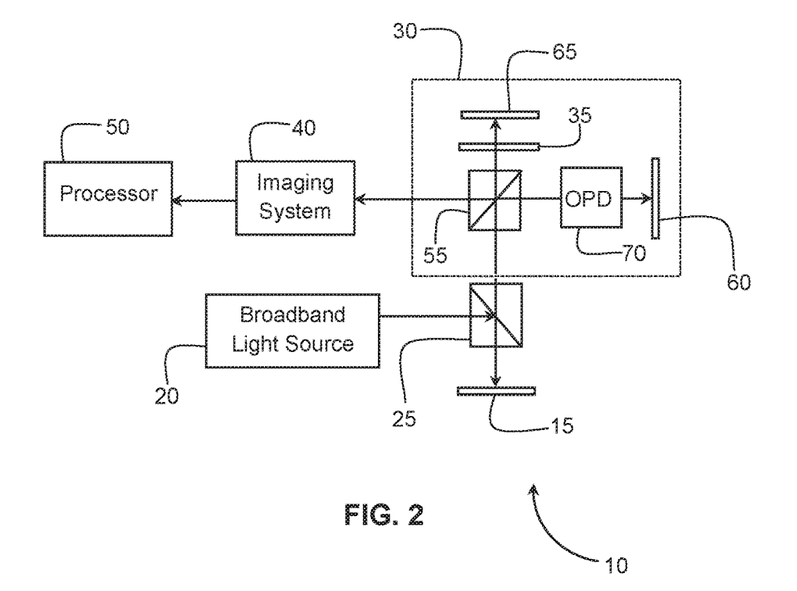
FIG. 2 shows schematically a tomographic measuring system according to a first embodiment of the present invention.

FIG. 2 shows a tomographic and/or topographic measuring system 10 according to a first embodiment of the present invention for analyzing a layered object 15. The system 10 includes a broadband light source 20, a beam splitter 25, an interferometer 30, a Spatial Light Modulator (SLM) 35, an imaging system 40 that typically includes a 2-dimensional color camera and a processor unit 50. The interferometer 30 has a beam splitter 55 and first and second mirrors 60, 65. The measuring system 10 may operate in a reflective mode (as in the figure) or in a transmissive mode for a transparent object. Light emitted from the broadband light source 20 illuminates the object 15 directly or via the beam splitter 25 located in the light path. The bandwidth of light can be chosen to determine the resolution and the dynamic range of the coherence envelope according to the application.

The light reflected from the object is split into two beams by the interferometer's beam splitter 55 and is directed to the mirrors 60 and 65. The beam splitter may 55 be configured to split the wave packets using amplitude division, where the amplitude is divided by the beam splitter 55 and one part of the amplitude is directed to the first mirror 60 and the other part is directed to the second mirror 65; or it may be configured to split the wave packets using wavefront division where part of the wavefront is directed to the first mirror 60 and the other part is directed to the second mirror 65. A compensation device 70 is placed in the optical path of one beam. The compensation device 70 introduces a certain OPD between both beams that are reflected back by the two mirrors 60, 65. Alternatively, two or more functions such as beam splitting and OPD compensation may be carried out by a single, combined device. The compensation device 70 may be a fixed compensation device such as a glass plate or a Diffractive Optical Element (DOE) that introduces a certain fixed OPD, or a variable compensation device such as an LCD that changes the refractive index or one of the moveable interferometer's mirrors and can introduce a variable OPD.

In addition to the compensation device 70, the SLM 35 is placed in the optical path of one of the two beams and may introduce additional different phase delays to the light. The object 15 is imaged by the imaging system 40 that includes a camera having an array of detector elements on which the two beams originated by the object interfere. While the OPD between the two beams is changed constantly as a function of time, a respective interferogram is generated at each pixel. For each detector element, the interference intensities as a function of the OPDs and the phase delays created by the SLM 35 and the compensation device 70 are processed by the processor unit 50.

Whenever the OPD between the two split beams of the reflected light from a certain object's layer is smaller than the coherence length of the light source, interference fringes are visible. In this case, it is hard to calculate accurately the thicknesses of the different layers using short coherence interferometry algorithms and the thickness of each layer is determined roughly as the OPD at which the maximum modulation of the interference signal occurs. However, within the coherence range, long coherence interferometry algorithms such as Phase Shift Interferometry (PSI) also can be used to increase the accuracy since as was said above the interference pattern is similar to that obtained using a monochromatic light with the wavelength $\lambda_0$. Thus, by introducing at least three different phase delays to one beam relative to the other by the SLM 35 and measuring the intensities, a PSI is realized and the phase of the wavefront of the mean wavelength can be calculated by the processor unit 50. The PSI process described above can be applied to each layer when the current OPD is smaller than the coherence length and when its wave packet overlaps any wave packet of any layer of different pixel. In addition the phases of all envelopes of each same pixel can also be compared to increase the accuracy of the thicknesses measurements. The connection between thickness and phase is:

$$\Delta d = \frac{\lambda_0}{4\pi n} \Delta \phi$$

where $\lambda_0$ is the mean wavelength, $\Delta\phi$ is the phase change and $\Delta d$ is the thickness.

This means that any change $\Delta\phi$ in the phase corresponds to a correction of the thickness by $\Delta d$. Comparison between the phases of each envelope of one pixel to each phase of each envelope of another pixel also increases the accuracy not only of the tomography measurement but also the topography measurement of the measured object. If the OPDs between some layers are larger than the coherence length of the light source, the excess of these OPDs relative to the coherence length of the light source can be compensated for by the compensation device 70 and the fringes will reappear similar to using a monochromatic light with the mean wavelength $\lambda_0$. Thus, the PSI algorithms can be applied again for phase calculations by introducing at least three different phase delays to one beam relative to the other. Knowing the phase can help in calculating the thicknesses of those layers with compensated OPDS to the sub-wavelength accuracy. The different phase delays may be introduced in many ways known in the art, simultaneously or one at a time, by a diffractive optical element (DOE), a moving mirror, an LCD, a retarding element, by varying the compensation created by the compensation device 70, etc. The OPD compensation enables the long coherence interferometry to be combined with the short coherence interferometry.

Figure 3:
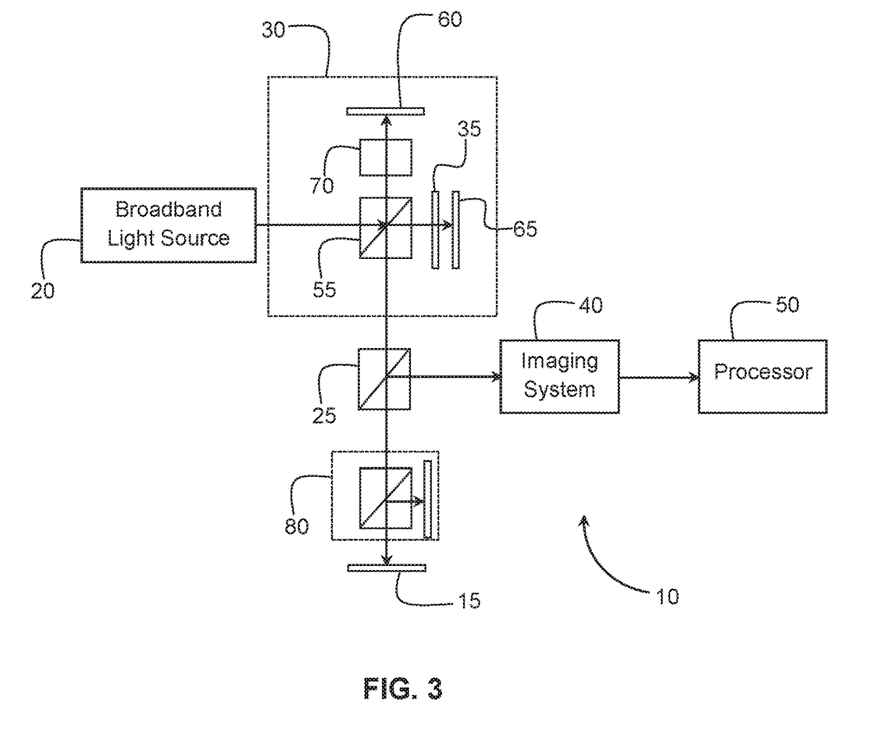
FIG. 3 shows schematically a tomographic measuring system according to a second embodiment.

FIG. 3 shows another embodiment, where the OPD is compensated for in the illumination path before illuminating the object. In this embodiment, the incoming light from the light source is split by the interferometer's beam splitter 35 into two beams and a given OPD is introduced into one beam relative to the other by the compensation device 70 as described above. Both beams illuminate the object 15. This can be interpreted as creating two wave packets with a certain OPD between both of them. When these two wave packets are reflected from a layered object, each layer of the object reflects both illuminating wave packets and many reflected wave packets are created, two reflected wave packets being reflected from each layer. For each illuminating wave packet, the OPDs between the wave packets reflected by each layer from each point of the object correspond to the OPDs between the respective layers of the object at the given point. Whenever any reflected wave packet attributed to the first illuminating wave packet overlaps another reflected wave packet attributed to the second illuminating wave packet, the interference fringes are visible. In this case the phase of the interference can be calculated using PSI by adding at least three additional phase delays as described above. To generate overlapping between all reflected wave packets, the OPD between the two split illuminating beams can be varied to cover all ranges needed. At each overlapping range the PSI can be utilized by creating at least three known phase delays.

Figure 4:
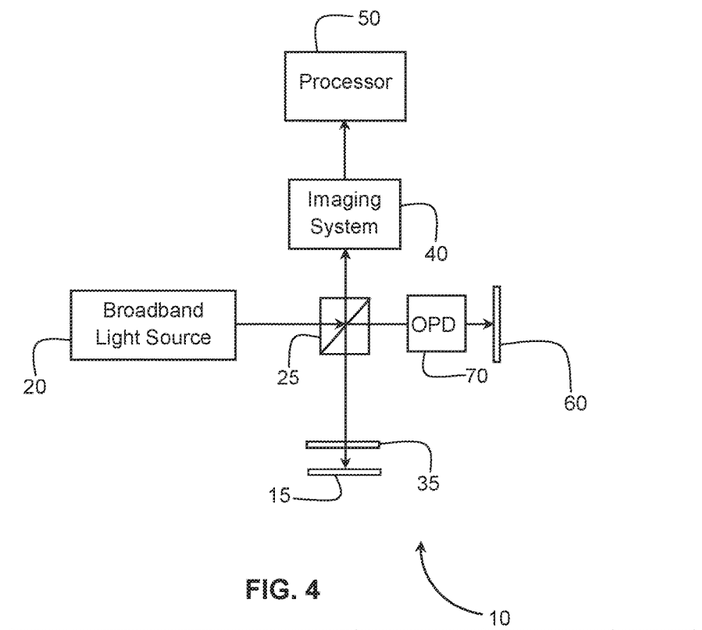
FIG. 4 shows one embodiment of a digital Holography system according to an embodiment of the invention.

FIG. 4 shows another embodiment where the light emitted from the light source 20 is split into two beams by a beam splitter 25, one beam being directed to the object 15 and the other beam being directed to a first mirror 60. The compensation device 70 and the SLM 35 are placed in the optical path of one or both beams. The tomography and/or topography of the long and short coherence measurements combinations can be applied similarly to what described above whenever the OPD between the wave packet of the light reflected from the reference mirror and a certain wave packet reflected from a certain layer of the object. The phases of the different wave packets of the same pixel can be compared to increase the accuracy. The phases all different wave packets of a certain pixel can also be compared the phases all different wave packets of another pixel whenever they overlap.

When the imaging system 40 of the embodiments described above includes a color camera, such as an RGB camera, a multispectral camera or a hyperspectral camera, each color band acts as a monochromatic light beam with a wavelength equal to the mean wavelength of that band, as described above. As long as the OPD between the two split beams is smaller than the coherence length of the respective color band, the PSI algorithms can be applied for each band by introducing at least three different phase delays to one beam relative to the other by the SLM 35, as described above. Using PSI with several different wavelengths can solve the $2\pi$ ambiguity and increase the dynamic range of the measurements.

Figure 5:
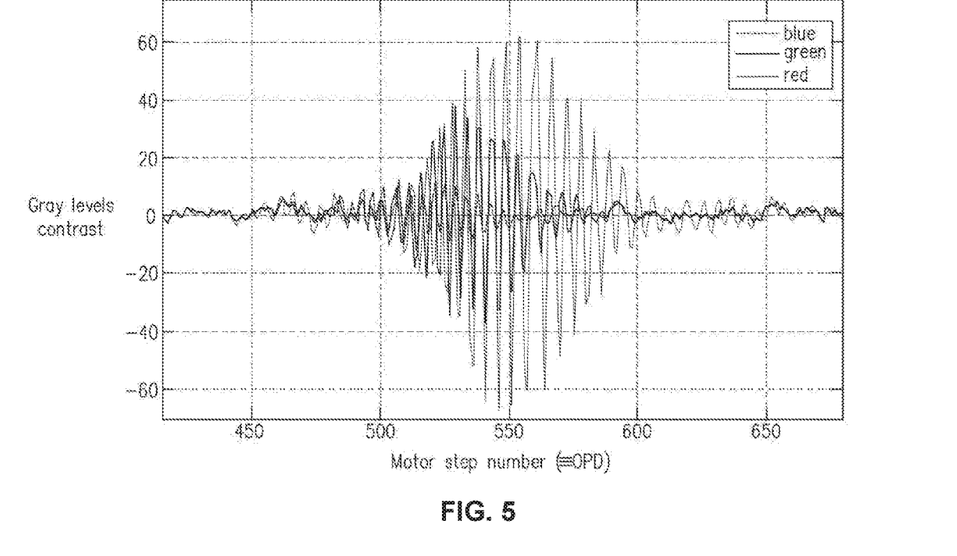
FIG. 5 is a graphical representation of non-overlapping wave packets of different bands.

The initial OPDs imposed between the different color bands of one branch of the split illuminating beam (constituting a first wave packet) and the corresponding color bands in the second branch of the split illuminating beam (constituting a second wave packet) may be different. In this case, the OPDs between the color bands of each split beam will determine whether and which bands overlap, such that only in respect of color bands that do overlap will fringes be visible thereby allowing long coherence interferometry according to the invention. This can increase the dynamic range of the long coherence interferometry measurements by measuring the object using different bands at successive ranges. The OPDs between the different wave packets can be varied by placing different dispersive elements in the optical path of one beam or by using a spectral dependent compensator 70 that introduces different OPDs to different color bands. The basic resolution and the accuracy remain while the dynamic range is increased. In the case where the different OPDs are known either because they are measured or because known OPDs are introduced, the different measurements with the different bands can also be registered, compensated for electronically and recombined electronically to obtain an overall very wide band measurement.

Another usage for non-overlapping coherence functions is scaling successively the movement of the reference mirror of the interferometer at long distance. Since the mean wavelength of each band is known, the whole movement range of the reference mirror of the interferometer is scaled successively according to the period of each mean wavelength that can be seen for a certain wave packet at a certain range of OPD. When the fringes of one band disappear, other fringes of another bad appear. The different measurements with the different bands can be registered, compensated for the known OPDs differences and recombined electronically to obtain an overall wide band measurement. The knowledge of the combinations of what color band has or does not have fringes at a certain compensated OPD can also help for resolving the $2\pi$ ambiguity.

For all embodiments, it is well understood that there is an ability to compensate for the OPD and make the different phase shifts simultaneously so as to have the option to combine the fine long coherence interferometry measurements with the coarse short coherence interferometry measurements. This can be applied for all applications that incorporate interfaces that span in large distances one from the other.

The three different phase delays may also be introduced in the imaging path or in the illumination path in many ways known in the art, one at a time or simultaneously in three or more different light paths.

It is well understood that in all abovementioned embodiments other interferometers configurations such as Mirau interferometer, Linnik interferometer, etc., can also be used.

The above-mentioned approach of combining the long coherence interferometry with the short coherence interferometry by OPD compensation also holds for combining the long coherence interferometry with all kinds of Optical Coherence Tomography (OCT), such as Time Domain—OCT, Fourier Domain—OCT, Dual Beam OCT, Swept Source (tunable monochromatic source) OCT etc., in 1D (point by point scan) or full field 2D configurations. For example, a Dual Beam OCT may be realized by adding a second interferometer 80 to the embodiment shown in FIG. 3. Before illuminating the object, the light propagates through the second interferometer 80 and is split. Part of it is directed to the object and part of it is directed to the reference mirror. The interferometer's reference mirror creates an additional reference layer that its reflected light interferes with the light reflected from the object's layers. Adding the at least three phase delays combines the PSI with the Dual Beam OCT at the range of the coherence length of the light source.

Another example is the combination of the Fourier Domain—OCT and the PSI. At least three measurements are compared where at each measurement there is a different phase shift between the reference mirror and the object. The interferograms are obtained by Fourier transformation of the measured spectrograms. As is known in the art, the OPD between the oscillations of the interferograms represent the optical thicknesses of the different layers of the object. The phase of each oscillation and thus the phase of the light reflected from the object, can be calculated by PSI algorithms using the at least three measurements mentioned above. The comparison of the phases of all oscillations of the same point and the comparison of the phases of all oscillations from point to point provide data of fine changes in the thicknesses of the layers of the object.

As mentioned above, the combination of long coherence interferometry with the short coherence interferometry by OPD compensation can also be applied for topography measurements, in which white light interferometry is used for measuring the topography of an object. As long as the OPDs between the interferometer's reference mirror and all object's heights are within the coherence length of the light source, long coherence phase shift interferometry algorithms can be used in an identical manner to using a monochromatic light with the mean wavelength $\lambda_0$. The $2\pi$ ambiguity problem can also be solved by known unwrapping algorithms also for this case. When the object's heights ranges are large, the fringes can be seen only for object's heights that have OPDs shorter than the coherence length of the light source, relative to the reference mirror. For these heights the light acts as a monochromatic light with the mean wavelength. Therefore, by introducing at least three phase delays, the PSI algorithms can be applied for these heights and the phase of the wavefront of the mean wavelength can be calculated. Knowing the phase can help in calculating the height of the object to the sub-wavelength accuracy. The rough movements of the reference mirror provide the rough measurements of the object's height while the said phase shift interferometry provides the fine measurements of the object object's height. The $2\pi$ ambiguity problem of the fine measurements can also be solved by known unwrapping algorithms.

The OPD compensation approach described above can also be applied for a white light holography, either digital holography or regular holography. In digital holography, a continuous change in the OPD between the object and the reference beam is created by moving a mirror or some other means and a continuous video of the hologram is taken. The reconstruction may be done electronically at the frames where the fringes are visible after subtracting the DC illumination, using digital holography algorithms. In this way, parts of the object's surface can be reconstructed electronically from the frames where the fringes are visible by subtracting the DC illumination and using the mean wavelength for the reconstructions. The whole surface can be tailored by tailoring the reconstructed parts and knowing the OPDs corresponding to the frames where the fringes are visible. Moreover, since the video has many frames of visible fringes as long as the OPD is within the coherence length, each frame is actually a hologram and the electronic reconstruction can be done many times for each frame and the accuracy of the reconstruction can be increased using all reconstructions.

In all cases described above, the compensation OPD between the reference and a certain distance and/or the phase shifts do not have to be realized by actually moving a reference mirror or using a compensating device. The same effect can also be achieved by modulating the spectra of the incoming light from the broadband light source with a varying cosine function before impinging on the object to be measured using topography or tomography. A given cosine modulation to the spectra is equivalent to introducing a given OPD between the two interfering beams. The modulation can be effected by any means such as Michelson interferometer, etc.

In all cases described above, additional optical elements such as lenses, mirrors, polarizers may be added to obtain the imaging process and/or to obtain polarized light.

The two interfering beams may also be the two different polarizations of the illuminating light where all the methods of applying OPDs and/or applying phase shifts as described above are applied to these two polarized beams. These two beams can be combined and propagate through an analyzer to obtain the interference fringes as described above.

It should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

The invention claimed is:

1. A method for determining data relating to an object, the data being selected from the group consisting of: tomographic data and topographic data, the method comprising:
   illuminating the object with at least one wave packet from light generated by a multi-spectral light source;
   splitting the wave packet into two split wave packets;
   introducing an optical path difference (OPD) between said two split wave packets that is smaller than the coherence length of the wave packet;
   combining the two split wave packets to generate a 2D image of the illuminated object; and
   determining the selected data relating to the object, by processing the 2D image using long coherence phase shift interferometry algorithms, by analyzing the 2D image as if the 2D image was generated using monochromatic light having a wavelength that is equal to a mean wavelength of the wave packet.

2. The method according to claim 1, further comprising spectrally modulating the light generated by the light source.

3. The method according to claim 1, wherein introducing the OPD comprises introducing the OPD using a compensator inserted in a path of one of the split wave packets prior to the split wave packet striking the object.

4. The method according to claim 1, wherein introducing the OPD comprises introducing the OPD using a compensator inserted in a path of one the split wave packets after the split wave packet is reflected from the object.

5. The method according to claim 1, wherein introducing the OPD comprises introducing an OPD that is variable.

6. The method according to claim 1, further comprising:
   splitting the split wave packets to produce at least three illumination paths; and
   introducing respective phase shifts simultaneously into said illumination paths.

7. The method according to claim 1, wherein splitting the wave packet comprises splitting the wave packet using amplitude division.

8. The method according to claim 1, wherein splitting the wave packet comprises splitting the wave packet using wavefront division.

9. The method according to claim 1, wherein determining the selected data comprises performing optical coherence tomography using full field area scanning of the object.

10. The method according to claim 1, wherein determining the selected data further comprises performing digital holography.

11. The method according to claim 1, wherein introducing the OPD comprises modulating spectral bands of the light with a varying cosine function.

12. The method according to claim 1, wherein splitting the wave packet into two split wave packets comprises splitting the wave packet into two split wave packets that relate to two mutually orthogonal polarizations of the light beam.

13. The method according to claim 1, further comprising introducing respective phase shifts into an illumination path of the light.

14. The method according to claim 1, wherein:
   illuminating the object with at least one wave packet from the light source comprises illuminating the object with a plurality of wave packets, each of the wave packets corresponding to light of a respective, different spectral band within the light generated by the multi-spectral light source;
   splitting the wave packet into two split wave packets comprises splitting each of the wave packets into a respective pair of split wave packets;
   introducing the OPD comprises introducing, between each pair of split wave packets, an OPD that is smaller than a coherence length of the corresponding wave packet;
   combining the two split wave packets to generate the 2D image of the illuminated object comprises combining each pair of split wave packets to generate a respective 2D image of the illuminated object; and
   determining the selected data relating to the object comprises analyzing each of the 2D images as if the 2D image was generated using monochromatic light having a wavelength that is equal to a mean wavelength of the spectral band corresponding to the wave packet from which is was generated.

15. The method according to claim 14, wherein combining each pair of split wave packets to generate the 2D images of the illuminated object comprises simultaneously generating each of the respective 2D images of the illuminated object, using a color camera.

16. The method according to claim 15, wherein analyzing each of the 2D images comprises simultaneously analyzing each of the 2D images of the illuminated object.

17. The method according to claim 14, wherein introducing the OPD comprises introducing, between each pair of split wave packets, a respective, different OPD.

18. The method according to claim 17, wherein processing the 2D images comprises obtaining an overall wide band measurement, by compensating for the respective, different OPDs between the respective pairs of wave packets.

19. Apparatus for determining data relating to an object, the data being selected from the group consisting of: tomographic data and topographic data, the apparatus comprising:

a multi-spectral light source configured to illuminate the object with at least one wave packet of light;

a beam splitter configured to split the wave packet into two split wave packets;

a compensation device configured to introduce an optical path difference (OPD) between said two split wave packets that is smaller than the coherence length of the wave packet;

an imaging system configured to combine the two split wave packets to generate a 2D image of the illuminated object; and a processor unit configured to determine the selected data relating to the object, by processing the 2D image using long coherence phase shift interferometry algorithms, by analyzing the 2D image as if the 2D image was generated using monochromatic light having a wavelength that is equal to a mean wavelength of the wave packet.

20. The apparatus according to claim 19, wherein:

the multi-spectral light source is configured to illuminate the object with a plurality of wave packets, each of the wave packets corresponding to light of a respective, different spectral band;

the beam splitter is configured to split each of the wave packets into a respective pair of split wave packets;

the compensation device is configured to introduce, between each pair of split wave packets, an OPD that is smaller than a coherence length of the corresponding wave packet;

the imaging system is configured to combine each pair of split wave packets to generate a respective 2D image of the illuminated object; and the processor unit is configured to determine the selected data relating to the object, by analyzing each of the 2D images as if the 2D image was generated using monochromatic light having a wavelength that is equal to a mean wavelength of the spectral band corresponding to the wave packet from which is was generated.

* * * * *